(12) United States Patent
Huang

(10) Patent No.: US 11,144,223 B2
(45) Date of Patent: Oct. 12, 2021

(54) FLASH MEMORY INITIALIZATION SCHEME FOR WRITING BOOT UP INFORMATION INTO SELECTED STORAGE LOCATIONS AVERAGELY AND RANDOMLY DISTRIBUTED OVER MORE STORAGE LOCATIONS AND CORRESPONDINGLY METHOD FOR READING BOOT UP INFORMATION FROM SELECTED STORAGE LOCATIONS

(71) Applicant: Silicon Motion, Inc., Hsinchu County (TW)

(72) Inventor: Sheng-Yuan Huang, New Taipei (TW)

(73) Assignee: Silicon Motion, Inc., Hsinchu County (TW)

(*) Notice: Subject to any disclaimer, the term of this patent is extended or adjusted under 35 U.S.C. 154(b) by 74 days.

(21) Appl. No.: 16/747,551

(22) Filed: Jan. 21, 2020

(65) Prior Publication Data
US 2021/0223970 A1   Jul. 22, 2021

(51) Int. Cl.
*G06F 3/06* (2006.01)

(52) U.S. Cl.
CPC .......... *G06F 3/0632* (2013.01); *G06F 3/0616* (2013.01); *G06F 3/0659* (2013.01); *G06F 3/0679* (2013.01)

(58) Field of Classification Search
CPC .... G06F 11/1464; G06F 3/0619; G06F 3/064; G06F 3/0647; G06F 3/0653; G06F 3/067; G06F 11/1451; G06F 11/1469
See application file for complete search history.

(56) References Cited

U.S. PATENT DOCUMENTS 8,171,277 B2 * 5/2012 Smith ................. G06F 11/1068
713/2
8,867,289 B2   10/2014 Wu
(Continued)

FOREIGN PATENT DOCUMENTS

CN         1979449 B     10/2010
TW       201351415 A     12/2013
(Continued)

OTHER PUBLICATIONS

Micron, NAND Flash 101: An Introduction to NAND Flash and How to Design It in to Your Next Product, pp. 1-27 (Year: 2006).*

*Primary Examiner* — Tammara R Peyton
(74) *Attorney, Agent, or Firm* — Winston Hsu

(57) ABSTRACT

A flash memory initialization method executed by a flash memory initialization device to initialize a flash memory device having a flash memory and a flash memory controller includes: determining an acceptable maximum number N of candidate addresses; determining a number M of different capacity sizes; classifying the candidate addresses into M portions; determining a difference value between two address values of any two adjacent addresses among the m-th portion of candidate addresses; determining multiple address values of the m-th portion of candidate addresses according to the difference value; and determining actual addresses of the m-th portion of candidate addresses according to the multiple address values; and controlling the flash memory controller to write the boot up information into at least one storage location corresponding to at least one of the m-th portion of candidate addresses according to the actual addresses.

20 Claims, 4 Drawing Sheets

(56) References Cited

U.S. PATENT DOCUMENTS

| | | | |
|---|---|---|---|
| 9,245,634 B2 | 1/2016 | Conley | |
| 2005/0120146 A1* | 6/2005 | Chen | G06F 13/28 |
| | | | 710/22 |
| 2011/0072199 A1* | 3/2011 | Reiter | G06F 12/0246 |
| | | | 711/103 |
| 2013/0097403 A1* | 4/2013 | Zheng | G06F 12/1036 |
| | | | 711/206 |
| 2015/0280749 A1* | 10/2015 | Gjorup | G06F 11/1072 |
| | | | 714/752 |

FOREIGN PATENT DOCUMENTS

| | | |
|---|---|---|
| TW | 201939282 A | 10/2019 |
| WO | 2018/072442 A1 | 4/2018 |

* cited by examiner

FLASH MEMORY INITIALIZATION SCHEME FOR WRITING BOOT UP INFORMATION INTO SELECTED STORAGE LOCATIONS AVERAGELY AND RANDOMLY DISTRIBUTED OVER MORE STORAGE LOCATIONS AND CORRESPONDINGLY METHOD FOR READING BOOT UP INFORMATION FROM SELECTED STORAGE LOCATIONS

BACKGROUND OF THE INVENTION

1. Field of the Invention

The invention relates to a scheme of initializing a flash memory, and more particularly to a method used by a flash memory initialization device and a flash memory controller for controlling a flash memory device.

2. Description of the Prior Art

Generally speaking, a flash memory device comprises a controller and a flash memory wherein the controller when powered needs to successfully read boot up information from the flash memory before a timer expires so as to use the boot up information to retrieve firmware from the flash memory. The boot up information may be stored in a particular block of the flash memory. However, if the flash memory becomes a downgraded product and the particular block is a bad block of the flash memory, the memory device will fail.

A conventional method may be arranged to store the boot up information into fixed pages in one or more blocks when initializing the flash memory and to read the boot up information from the fixed pages when the controller is powered. For example, the conventional method is arranged to store the boot up information into the pages which are separated by a fixed number of pages such as 64 pages in one block. If the controller merely tries to read the boor up information from the flash memory for at most 512 times before the timer expires, the controller only checks whether the boot up information is stored in 256 consecutive blocks of the flash memory when one block has 128 pages. However, if one block has 4096 pages, the controller only checks whether the boot up information is stored in 8 consecutive blocks of the flash memory. That is, if the 8 consecutive blocks become bad blocks, then the controller cannot retrieve the boot up information to obtain the firmware and the operation of the controller and memory device will fail. Thus, the conventional method cannot be applied into a variety of types of flash memories.

SUMMARY OF THE INVENTION

Therefore one of the objectives of the invention is to provide a flash memory initialization method executed by a flash memory initialization device and a flash memory controller for controlling a flash memory device, to solve the above-mentioned problems.

According to an embodiment of the invention, a flash memory initialization method executed by a flash memory initialization device is disclosed. The method is arranged to initialize a flash memory device comprising a flash memory and a flash memory controller. The method comprises: determining an acceptable maximum number N of candidate addresses each being formed by a combination of a row address and a column address wherein N is an integer; determining a number M of different capacity sizes which can be supported by the flash memory device wherein M is an integer smaller than N; classifying the candidate addresses into M portions respectively corresponding to the different capacity sizes to determine a number of candidate addresses in each of the M portions; for an m-th portion of candidate addresses wherein m ranges from one to M: determining a difference value between two address values of any two adjacent addresses among the m-th portion of candidate addresses; determining multiple address values of the m-th portion of candidate addresses according to the difference value between the two address values of the any two adjacent addresses; and determining actual addresses of the m-th portion of candidate addresses according to the multiple address values of the m-th portion of candidate addresses. In addition, the method further comprises writing boot up information from the flash memory initialization device into the flash memory device by controlling the flash memory controller to write the boot up information into at least one storage location corresponding to at least one of the m-th portion of candidate addresses in the flash memory device according to the actual addresses of the m-th portion of candidate addresses.

According to an embodiment of the invention, a flash memory controller for controlling a flash memory device is disclosed. The controller comprises a read-only memory (ROM) for recording a specific program code and a processing circuit coupled to the ROM and used for reading the specific program code when the controller is powered. The processing circuit is arranged for executing the specific program code to: determining an acceptable maximum number N of candidate addresses each being formed by a combination of a row address and a column address wherein N is an integer; determining a number M of different capacity sizes which can be supported by the flash memory device wherein M is an integer smaller than N; classifying the candidate addresses into M portions respectively corresponding to the different capacity sizes to determine a number of candidate addresses in each of the M portions; for an m-th portion of candidate addresses wherein m ranges from one to M: determining a difference value between two address values of any two adjacent addresses among the m-th portion of candidate addresses; determining multiple address values of the m-th portion of candidate addresses according to the difference value between the two address values of the any two adjacent addresses; and determining actual addresses of the m-th portion of candidate addresses according to the multiple address values of the m-th portion of candidate addresses. In addition, the processing circuit is arranged for executing the specific program code to writing boot up information from the flash memory initialization device into the flash memory device by controlling the flash memory controller to write the boot up information into at least one storage location corresponding to at least one of the m-th portion of candidate addresses in the flash memory device according to the actual addresses of the m-th portion of candidate addresses.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
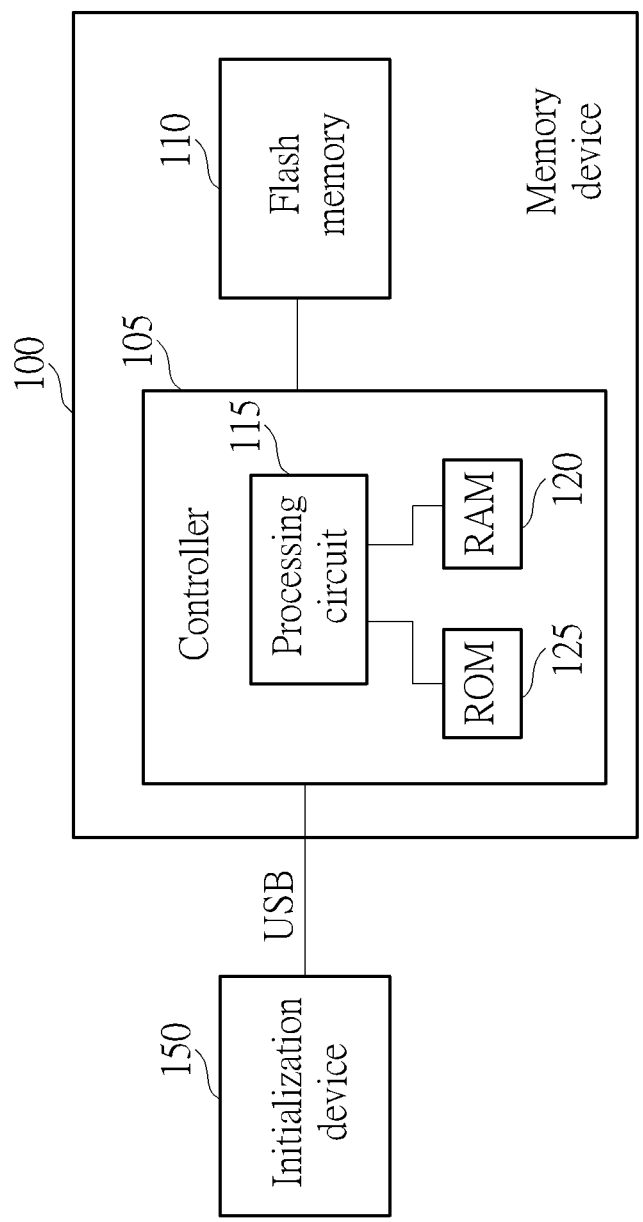
FIG. 1 is a block diagram showing an example of using a flash memory initialization device to write boot up information into a memory device according to an embodiment of the invention.

FIG. 1 is a block diagram showing an example of using a flash memory initialization device 150 to write boot up information into a memory device 100 according to an embodiment of the invention. The memory device 100 such as a storage device (e.g. a solid-state drive or a secure digital (SD) memory card (but not limited)) comprises a flash memory controller 105 and a flash memory 110. The controller 105 comprises a processing circuit 115, a random access memory (RAM) 120, and a read-only memory (ROM) 125 which records a boot up program code.

The flash memory initialization device 105 for example is a computer used as an initialization tool device which is used by a memory device manufacturer to load an initialization program to generate boot up information when the manufacturer generates/produces the memory device 100 such as an SD card or SSD. The initialization program and the controller 105 can be provided by a controller manufacturer. The initialization tool device 150 is connected to the memory device 100 via an interface such as USB interface (but not limited).

For instance, after the memory device manufacturer decides the type of a flash memory and selects a corresponding controller, the memory device manufacturer initializes the flash memory 110 by loading and executing the initialization program provided by the controller manufacturer. The initialization program generates the boot up information, and transmits the generated boot up information to the RAM 120 of the controller 115 via the USB interface.

Then the controller 115 transfers and writes the boot up information buffered in the RAM 120 to appropriate row and column address addresses of the flash memory 110. That is, the initialization device 150 is arranged to control the controller 105 to write the boot up information into the flash memory 110.

The appropriate row and column addresses for storing the boot up information is/are determined by the initialization program running on the initialization tool device 150 according to a specific rule so that the appropriate row and column addresses equivalently can be distributed averagely over all (or a large portion of) row and column addresses as far as possible.

Storing the boot up information into the appropriate row and column addresses distributed averagely as far as possible is to avoid a block become a bad block.

The ROM 125 of controller 105 records the same specific rule. Thus, after leaving the factory, the processing circuit 115 of the controller 105 can be arranged to successfully read the boot up information from the appropriate row and column addresses in the flash memory 110 based on the same specific rule recorded in the ROM 125 when the memory device 100 is powered on. The processing circuit 115 then can read/retrieve and execute a dedicated firmware program from a particular location of the flash memory 110 based on the boot up information. That is, the operation of the initialization program for determining the appropriate row and column addresses is similar to that of controller 105 for finding the appropriate row and column addresses.

It should be noted that a block or a page of the flash memory 110 used for recording the boot up information can be referred to as an information block or an information page.

In practice, the initialization program is arranged to generate a candidate or golden row and column address table which is used for recording which row and column addresses are selected/used as candidate/golden row and column addresses to store the boot up information into at least one storage location such as sector (s) or byte(s) corresponding to at least one combination of the candidate row and column addresses. The initialization program is used to determine the candidate row and column addresses so that the candidate row and column addresses can be averagely distributed over all (or a large portion of) sectors or all (or a large portion of) bytes. It should be noted that for example an address is formed by a row address such as three bytes and a column address such as two bytes. That is, an address is implemented for example by five bytes (but not limited).

The initialization program is arranged to determine an acceptable total/maximum number of candidate/golden addresses each being formed by a combination of a row address and a column address and to determine capacity sizes of flash memories which can be supported by the initialization program.

For example, the acceptable total/maximum number of candidate addresses is configured as N wherein N is an integer such as 512 (but not limited).

The initialization program is arranged to write the boot up information into storage location (s)/space (s) of one or more of the N candidate addresses, and after leaving the factory the flash memory controller 105 is arranged to try to read back the boot up information according to information recorded at the storage location (s)/space (s) of one or more of the N candidate addresses.

The capacity sizes of flash memories which can be supported by the initialization program may comprise M different types wherein M is an integer equal to or larger than one. For example, M is an integer such as eight (but not limited) and satisfies the equation: $N=M\times 2^A$, A is an integer.

For example, the capacity sizes of flash memories which can be supported by the initialization program may for example comprise 4 GB (gigabytes), 8 GB, 16 GB, 32 GB, 64 GB, 128 GB, 512 GB, and 1024 GB (but not limited).

The initialization program is arranged to classify/divide the N candidate/golden addresses into M portions averagely or non-averagely wherein the number of candidate/golden addresses belonging to a portion may be equal to or different from number of candidate/golden addresses belonging to another different portion. The M portions sequentially and respectively correspond to the M different capacity sizes.

In one embodiment, the initialization program is arranged to averagely classify all the N candidate/golden addresses respectively into the M different capacity sizes. All the N candidate/golden addresses are averagely divided into the M portions each comprising N/M candidate/golden addresses.

For example, the acceptable total/maximum number N of candidate addresses is configured as 512, and the capacity sizes of flash memories sequentially comprise eight different sizes such as 4 GB (gigabytes), 8 GB, 16 GB, 32 GB, 64 GB, 128 GB, 512 GB, and 1024 GB. All the 512 candidate/golden addresses are averagely divided into the 8 portions each comprising 64 candidate/golden addresses.

For the m-th portion of candidate addresses wherein m ranges from one to M, the initialization program is arranged to decide that the m-th portion of the candidate/golden addresses, i.e. N/M candidate/golden addresses, falls within the value range of addresses covered by the m-th capacity size from zero to $CAP_m \times 8^{10}$ wherein $CAP_m$ means the m-th capacity size in gigabytes. For example, if $CAP_m$ is equal to 4 which represents 4 GB, then the value range of addresses covered by the 4 GB capacity size is from zero to $4 \times 8^{10} = 2^{32}$. If $CAP_m$ is equal to 1024 which represents 1024 GB, then the value range of addresses covered by the 1024 GB capacity size is from zero to $1024 \times 81^{10} = 2^{40}$. In addition, the initialization program determines that the difference value between two address values of any two adjacent addresses among the m-th portion of the candidate/golden addresses is equal to $$\frac{CAP_m \times 8^{10}}{\frac{N}{M}}.$$

In addition, the initialization program determines that the address values of the m-th portion of the candidate/golden addresses may comprise $i_m$, $$\frac{CAP_m \times 8^{10}}{\frac{N}{M}} + i_m,$$

$$\frac{CAP_m \times 8^{10}}{\frac{N}{M}} \times 2 + i_m,$$

$$\frac{CAP_m \times 8^{10}}{\frac{N}{M}} \times 3 + i_m,$$

and $$\frac{CAP_m \times 8^{10}}{\frac{N}{M}} \times \left(\frac{N}{M} - 1\right) + i_m$$

wherein $i_m$ is an offset integer which may range from zero to $$\left(\frac{CAP_m \times 8^{10}}{\frac{N}{M}} - 1\right)$$

and can be determined by the initialization program. The initialization program is arranged to calculate the address values of the m-th portion of the candidate/golden addresses, and then select and determine the actual addresses of the m-th portion of the candidate/golden addresses based on the calculated address values.

It should be noted that in another embodiment the initialization program may decide the address values of a portion of the candidate/golden addresses, i.e. other 64 candidate/golden addresses, falls within the value range of addresses covered by the capacity size of 256 GB, i.e. the value range of address values from zero to $256 \times 8^{10} = 2^{38}$, if the flash memory supports the capacity size of 256 GB. Other operations are similar to the above portions of candidate/golden addresses, and are not detailed again for brevity.

Further, it should be noted that some address (or addresses) among a portion of the candidate/golden addresses may be identical to that or those among other portion(s) of the candidate/golden addresses; that is, some address (or addresses) may be repeatedly selected as a candidate/golden address by the initialization program. For example, the address corresponding to the address value '0' in the above embodiments is repeatedly selected as a candidate/golden address. The initialization program can check whether a candidate/golden address is a repeated candidate/golden address. If the candidate/golden address is in a good/undamaged storage block and the candidate/golden address is not a repeated candidate/golden address, then the initialization program is arranged to write the boot up information into a storage location corresponding to the candidate/golden address. If the candidate/golden address is identified as a repeated candidate/golden address, then the initialization program does not write the boot up information no matter if the candidate/golden address is in a good/undamaged storage block or not. That is, even though the candidate/golden address is in a good/undamaged storage block, the initialization program does not write the boot up information when the candidate/golden address is a repeated candidate/golden address.

Further, in other embodiments, the initialization program can be arranged to classify the N candidate/golden addresses respectively into M groups wherein the numbers of the M groups may be different. For example (but not limited), the number of a portion of candidate/golden addresses corresponding to a kind of capacity size may be different from the number of a portion of candidate/golden addresses corresponding to another different kind of capacity size. For instance, in above embodiments, the number of the first portion of candidate/golden addresses may be equal to 65 different from 64, and the number of the second portion of candidate/golden addresses may be equal to 63 different from 64; that is, the number(s) of one or more portions of candidate/golden addresses can be adjusted by the initialization program after calculation. However, this is not meant to be a limitation.

Further, in another modification, the initialization program may divide the N candidate addresses averagely or non-averagely into the M portions/groups wherein the M portions respectively correspond to the value ranges of different M groups of consecutive storage addresses. The M portions respectively correspond to the value ranges of consecutive storage addresses of $0 \sim CAP_1$ GB, $CAP_1 \sim CAP_2$ GB, $CAP_2 \sim CAP_3$ GB, . . . , $CAP_m \sim CAP_{m+1}$ GB, . . . , and $CAP_{M-1} \sim CAP_M$ GB, respectively. For example, the initialization program may divide the 512 candidate addresses averagely into 8 portions/groups wherein the 8 portions respectively correspond to the value ranges of consecutive storage addresses of 0~4 GB, 4 GB~8 GB, 8 GB~16 GB, 16 GB~32 GB, 32 GB~64 GB, 64 GB~128 GB, 128 GB~512 GB, and 512 GB~1024 GB, respectively.

For the first portion of candidate addresses, the initialization program determines that the address values of the first portion of the candidate/golden addresses, i.e. the address values of N/M candidate/golden addresses, falls within the value range of address values of storage locations/spaces defined by 0~$CAP_1$ GB, i.e. the value range of address values from zero to $CAP_1 \times 8^{10}$. The initialization program determines that the difference value between two address values of any two adjacent addresses among the first portion of the candidate/golden addresses is equal to $$\frac{CAP_1 \times 8^{10}}{\frac{N}{M}}.$$

The initialization program determines that the address values of the first portion of the candidate/golden addresses may comprise $i_1$, $$\frac{CAP_1 \times 8^{10}}{\frac{N}{M}} + i_1,$$

$$\frac{CAP_1 \times 8^{10}}{\frac{N}{M}} \times 2 + i_1,$$

$$\frac{CAP_1 \times 8^{10}}{\frac{N}{M}} \times 3 + i_1,$$

and $$\frac{CAP_1 \times 8^{10}}{\frac{N}{M}} \times \left(\frac{N}{M} - 1\right) + i_1$$

wherein $i_1$ is an offset integer which may range from zero to $$\left(\frac{CAP_1 \times 8^{10}}{\frac{N}{M}} - 1\right)$$

and can be determined by the initialization program.

Further, for the m-th portion of candidate addresses wherein m ranges from two to M, the initialization program determines that the address values of the m-th portion of the candidate/golden addresses, i.e. the address values of N/M candidate/golden addresses, falls within the value range of address values of storage locations/spaces defined by $CAP_{m-1}$~$CAP_m$ GB, i.e. the value range of address values from $CAP_{m-1} \times 8^{10}$ to $CAP_m \times 8^{10}$. The initialization program determines that the difference value between two address values of any two adjacent addresses among the m-th portion of the candidate/golden addresses is equal to $$\frac{CAP_m \times 8^{10} - CAP_{m-1} \times 8^{10}}{\frac{N}{M}}.$$

The initialization program determines that the address values of the m-th portion of the candidate/golden addresses may comprise $(CAP_{m-1} \times 8^{10} + i_m)$, $$\frac{CAP_m \times 8^{10}}{\frac{N}{M}} + (CAP_{m-1} \times 8^{10} + i_m),$$

$$\frac{CAP_m \times 8^{10}}{\frac{N}{M}} \times 2 + (CAP_{m-1} \times S^{10} + i_m),$$

$$\frac{CAP_m \times 8^{10}}{\frac{N}{M}} \times 3 + (CAP_{m-1} \times 8^{10} + i_m),$$

and $$\frac{CAP_m \times 8^{10}}{\frac{N}{M}} \times \left(\frac{N}{M} - 1\right) + (CAP_{m-1} \times 8^{10} + i_m)$$

wherein $i_m$ is an offset integer which may range from zero to $$\left(\frac{CAP_m \times 8^{10} - CAP_{m-1} \times 8^{10}}{\frac{N}{M}} - 1\right)$$

and can be determined by the initialization program.

In other embodiments, for the m-th portion of candidate addresses wherein m ranges from two to M, the initialization program determines that half of the address values of the m-th portion of the candidate/golden addresses, i.e. the address values of N/2M candidate/golden addresses, falls within the value range of address values of storage locations/spaces defined by $CAP_{m-1}$~$CAP_m$ GB, i.e. the value range of address values from $CAP_{m-1} \times 8^{10}$ to $CAP_m \times 8^{10}$. The initialization program determines that the difference value between two address values of any two adjacent addresses among the m-th portion of the candidate/golden addresses is equal to $$\frac{CAP_m \times 8^{10} - CAP_{m-1} \times 8^{10}}{\frac{N}{2M}}.$$

The initialization program determines that the address values of the m-th portion of the candidate/golden addresses may comprise $(CAP_{m-1} \times 8^{10} + i_m)$, $$\frac{CAP_m \times 8^{10}}{\frac{N}{2M}} + (CAP_{m-1} \times 8^{10} + i_m),$$

$$\frac{CAP_m \times 8^{10}}{\frac{N}{2M}} \times 2 + (CAP_{m-1} \times 8^{10} + i_m),$$

$$\frac{CAP_m \times 8^{10}}{\frac{N}{2M}} \times 3 + (CAP_{m-1} \times 8^{10} + i_m),$$

and $$\frac{CAP_m \times 8^{10}}{\frac{N}{2M}} \times \left(\frac{N}{2M} - 1\right) + (CAP_{m-1} \times 8^{10} + i_m)$$

wherein $i_m$ is an offset integer which may range from zero to $$\left(\frac{CAP_m \times 8^{10} - CAP_{m-1} \times 8^{10}}{\frac{N}{2M}} - 1\right)$$

and can be determined by the initialization program. This modified embodiment also obeys the spirits of the invention. In such embodiment, the number of candidate/golden addresses can be significantly reduced.

After selecting and determining (or generating) the M groups of candidate/golden addresses, the initialization program is used to control the controller 105 to sequentially use the selected candidate/golden addresses to write the boot up information into different storage location(s) corresponding to the selected candidate/golden address(es) and then read data from the storage location(s) to check whether the boot up information is successfully written into at least one storage location.

For example, the initialization program transmits the boot up information to the controller 105 and controls the processing circuit 115 of controller 105 to write the boot up information into a first storage location corresponding to a first candidate/golden address. If the first storage location is in a bad block and the boot up information is not successfully written into the flash memory, then the initialization program controls the processing circuit 115 of controller 105 to write the boot up information into a second storage location corresponding to a second candidate/golden address having an address value larger than that of first candidate/golden address. The initialization program does not control the processing circuit 115 of controller 105 to write the boot up information into the flash memory until the boot up information is successfully written. This example is not meant to be a limitation.

Thus, for the controller 105, after receiving the boot up information from the initialization tool device 150, the processing circuit 115 is arranged to temporarily store the boot up information in the RAM 120 and then to write the boot up information into a storage location based on a candidate/golden address determined by and sent from the initialization program running on the initialization tool device 150.

Accordingly, when the controller 105 is powered after leaving the factory, the processing circuit 115 is used to generate a sequence of address values which are identical to those generated by the initialization program at the factory based on the same rule employed by the initialization program wherein information of the rule can be recorded in the ROM 125. Then the processing circuit 115 is arranged to determine a sequence of candidate/golden addresses corresponding to the generated address values, and the candidate/golden addresses determined by the processing circuit 115 are identical to those generated by the initialization program since the processing circuit 115 and the initialization program employ the same rule. Then the processing circuit 115 is arranged to retrieve the boot up information sequentially based on one of the determined candidate/golden addresses.

Figure 2:
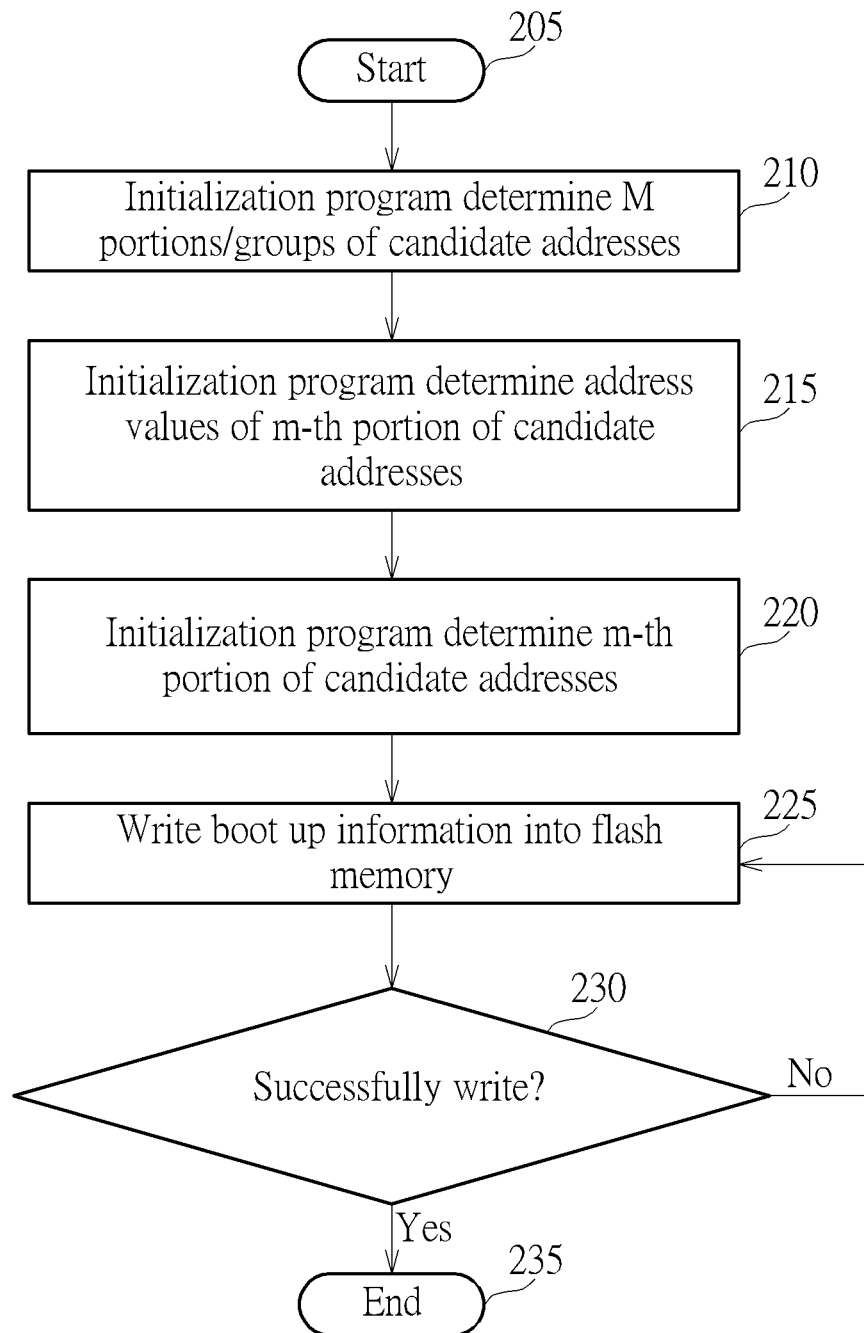
FIG. 2 is a diagram illustrating a flowchart of using the initialization program running on the initialization tool device to initialize the flash memory according to an embodiment of the invention.
Figure 3:
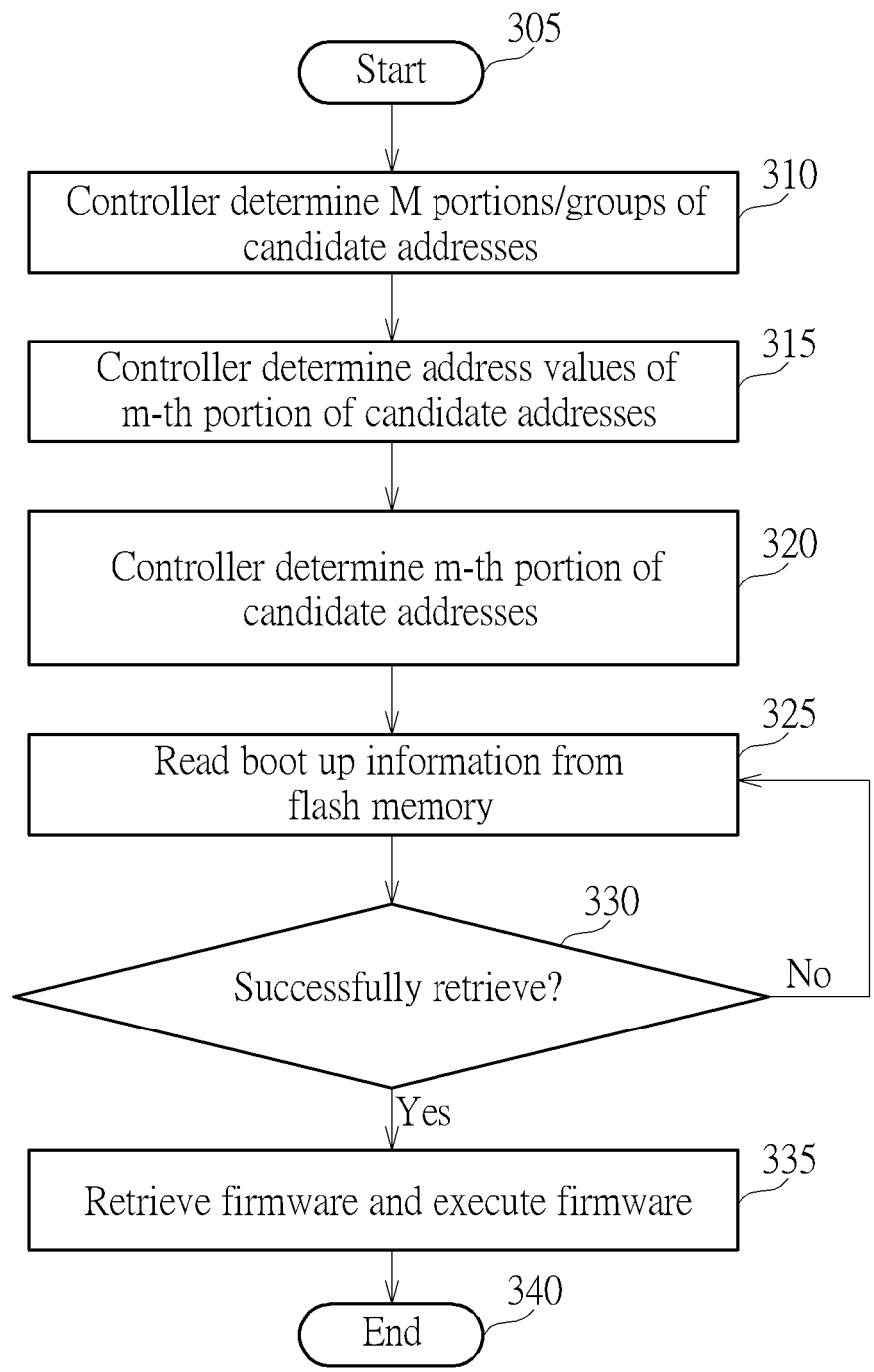
FIG. 3 is a diagram illustrating the operation of the controller when the controller is powered after leaving the factory according to the embodiment of FIG. 1.

To make readers more clearly understand the spirits of the inventions, FIG. 2 and FIG. 3 are provided; corresponding descriptions of steps are not detailed for brevity.

FIG. 2 is a diagram illustrating a flowchart of using the initialization program running on the initialization tool device 150 to initialize the flash memory 110 according to an embodiment of the invention. FIG. 3 is a diagram illustrating the operation of the controller 115 when the controller 115 is powered after leaving the factory according to the embodiment of FIG. 1. Provided that substantially the same result is achieved, the steps of the flowchart shown in FIGS. 2 and 3 need not be in the exact order shown and need not be contiguous, that is, other steps can be intermediate. Steps are detailed in the following:

Step 205: Start;

Step 210: Use the initialization program to determine M portions/groups of candidate addresses based on the acceptable maximum number N of candidate addresses wherein M is the number of different capacity sizes which can be supported by the initialization program and each of the M portions/groups comprise N/M number of candidate addresses;

Step 215: For the m-th portion of candidate addresses use the initialization program to determine the address values of the m-th portion of candidate addresses wherein the integer m ranges from one to M;

Step 220: Use the initialization program to select or determine the m-th portion of candidate addresses based on the determined address values;

Step 225: Use the initialization program to sequentially use a candidate address among the m-th portion of candidate addresses to write the boot up information into the flash memory 110;

Step 230: Determine whether the boot up information is successfully written into at least one of the selected candidate addresses. If yes, the flow proceeds to Step 235; otherwise, the flow proceeds to Step 225; and Step 235: End.

Step 305: Start;

Step 310: Use the controller to determine M portions/groups of candidate addresses based on the acceptable maximum number N of candidate addresses wherein M is the number of different capacity sizes which can be supported by the initialization program and each of the M portions/groups comprise N/M number of candidate addresses;

Step 315: For the m-th portion of candidate addresses use the controller to determine the address values of the m-th portion of candidate addresses wherein the integer m ranges from one to M;

Step 320: Use the controller to select or determine the m-th portion of candidate addresses based on the determined address values;

Step 325: Use the controller sequentially uses one address among the m-th portion of candidate addresses to read the boot up information from the flash memory 110;

Step 330: Determine whether the boot up information is successfully retrieved. If yes, the flow proceeds to Step 335; otherwise, the flow proceeds to Step 325;

Step 335: The controller retrieves the firmware based on the retrieved boot up information and executes the firmware; and Step 340: End.

Figure 4:
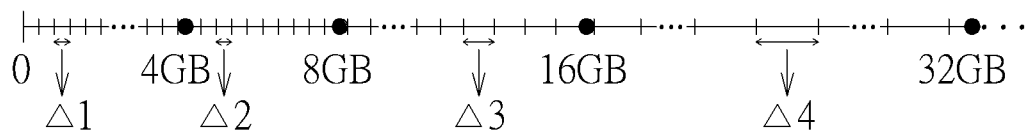
FIG. 4 is a diagram showing an example of different sets of candidate/golden addresses distributed over different address ranges corresponding to different capacity sizes of flash memories according to an embodiment of the invention.

FIG. 4 is a diagram showing an example of different sets of candidate/golden addresses distributed over different address ranges corresponding to different capacity sizes of flash memories according to an embodiment of the invention. An address is formed by five bytes. In this embodiment, for example, the different capacity sizes comprise 4 GB, 8 GB, 16 GB, and 32 GB (but not limited). That is, M is equal to four, and four sets of N/4 candidate/golden addresses are respectively and averagely distributed over the address ranges covered by zero to 4 GB, 4 GB to 8 GB, 8 GB to 16 GB, and 16 GB to 32 GB. The intervals Δ1, Δ2 between the address values of any two neighboring candidate/golden addresses within different address ranges covered by zero to 4 GB and 4 GB to 8 GB are identical. The intervals Δ1, Δ3, Δ4 between the address values of any two neighboring candidate/golden addresses within different address ranges covered by zero to 4 GB, 8 GB to 16 GB, and 16 GB to 32 GB are different.

Further, it should be noted that the value of N/M can be calculated as an odd value in other embodiments. For example, the value of N/M may be equal to 65 (as mentioned above). For instance, four sets of 65 candidate/golden addresses are respectively and averagely distributed over the address ranges covered by zero to 4 GB, 4 GB to 8 GB, 8 GB to 16 GB, and 16 GB to 32 GB. In an embodiment, the address values of two or more candidate/golden addresses are distributed over the address range of a storage space formed by multiple blocks, and all candidate/golden addresses are distributed over different address ranges of different storage blocks respectively; that is, the candidate/golden addresses are averagely distributed over different blocks. In another embodiment, the address values of two or more candidate/golden addresses are distributed over the address range of a storage block formed by multiple sectors, and all candidate/golden addresses are distributed over different address ranges of different storage sectors respectively; that is, the candidate/golden addresses are averagely distributed over different sectors. In another embodiment, the address values of two or more candidate/golden addresses may be distributed over the address range of a storage sector formed by multiple pages, and all candidate/golden addresses are distributed over different address ranges of different storage pages respectively; that is, the candidate/golden addresses are averagely distributed over different pages. In another embodiment, the address values of two or more candidate/golden addresses may be distributed over the address range of a storage page formed by bytes, and all candidate/golden addresses are distributed over different address ranges of different bytes respectively; that is, the candidate/golden addresses are averagely distributed over different bytes.

Figure 5:
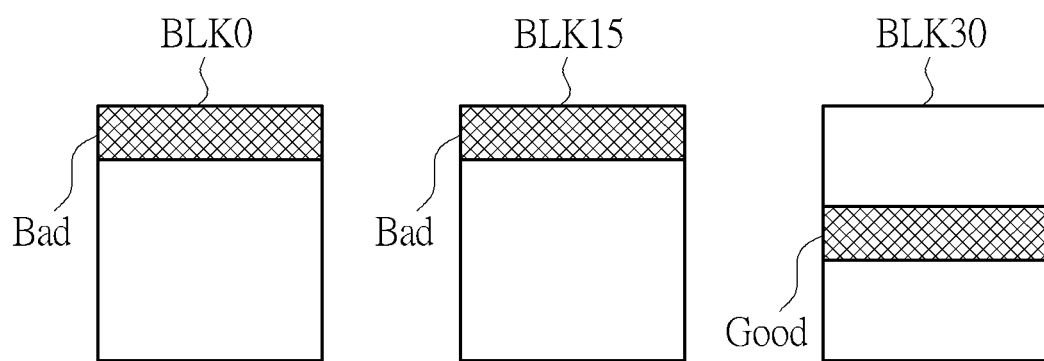
FIG. 5 is a diagram showing an example of the controller read or retrieve the boot up information from the storage locations specified by the candidate/golden addresses corresponding to different blocks BLK0, BLK15, and BLK30 according to an embodiment of the invention.

FIG. 5 is a diagram showing an example of the controller 105 read or retrieve the boot up information from the storage locations specified by the candidate/golden addresses corresponding to different blocks BLK0, BLK15, and BLK30 according to an embodiment of the invention. At first, the controller 105 tries to retrieve the boot up information from the storage location specified by the candidate/golden address corresponding to the block BLK0 and then will determine that the block BLK0 is a bad block. Then, the controller 105 tries to retrieve the boot up information from the storage location specified by the candidate/golden address corresponding to the block BLK15 and then will determine that the block BLK15 is a bad block. Then, the controller 105 tries to retrieve the boot up information from the storage location specified by the candidate/golden address corresponding to the block BLK30 and then determines that the block BLK30 is a good block and the boot up information can be correctly retrieved from the storage location specified by such candidate/golden address so as to obtain the firmware program.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory initialization method executed by a flash memory initialization device to initialize a flash memory device comprising a flash memory and a flash memory controller, comprising:

determining an acceptable maximum number N of candidate addresses each being formed by a combination of a row address and a column address wherein N is an integer;

determining a number M of different capacity sizes which can be supported by the flash memory device wherein M is an integer smaller than N;

classifying the candidate addresses into M portions respectively corresponding to the different capacity sizes to determine a number of candidate addresses in each of the M portions;

for an m-th portion of candidate addresses wherein m ranges from one to M:

determining a difference value between two address values of any two adjacent addresses among the m-th portion of candidate addresses;

determining multiple address values of the m-th portion of candidate addresses according to the difference value between the two address values of the any two adjacent addresses; and determining actual addresses of the m-th portion of candidate addresses according to the multiple address values of the m-th portion of candidate addresses; and writing boot up information from the flash memory initialization device into the flash memory device by controlling the flash memory controller to write the boot up information into at least one storage location corresponding to at least one of the m-th portion of candidate addresses in the flash memory device according to the actual addresses of the m-th portion of candidate addresses.

2. The flash memory initialization method of claim 1, wherein $N=M \times 2^A$, A is an integer.

3. The flash memory initialization method of claim 2, wherein the number of candidate addresses in each of the M portions is equal to N/M.

4. The flash memory initialization method of claim 1, wherein the step of determining the difference value between the two address values of the any two adjacent addresses among the m-th portion of candidate addresses comprises:
   determining a value range of addresses covered by a capacity size corresponding to the m-th portion of candidate addresses; and
   determining the difference value according to the value range and a total number of candidate addresses in the m-th portion of candidate addresses.

5. The flash memory initialization method of claim 4, wherein the capacity size indicates $CAP_m$ gigabytes; the value range is from zero to $CAP_m \times 8^{10}$; the difference value is equal to $$\frac{CAP_m \times 8^{10}}{\frac{N}{M}};$$

and, the multiple address values of the m-th portion of candidate addresses comprise $i_m$, $$\frac{CAP_m \times 8^{10}}{\frac{N}{M}} + i_m,$$

$$\frac{CAP_m \times 8^{10}}{\frac{N}{M}} \times 2 + i_m,$$

$$\frac{CAP_m \times 8^{10}}{\frac{N}{M}} \times 3 + i_m,$$

and $$\frac{CAP_m \times 8^{10}}{\frac{N}{M}} \times \left(\frac{N}{M} - 1\right) + i_m$$

wherein $i_m$ is an offset integer which may range from zero to $$\left(\frac{CAP_m \times 8^{10}}{\frac{N}{M}} - 1\right).$$

6. The flash memory initialization method of claim 1, wherein the step of determining the difference value between the two address values of the any two adjacent addresses among the m-th portion of candidate addresses comprises:
   determining a value range of consecutive storage addresses which are defined by a capacity size of the m-th portion of candidate addresses and another different capacity size; and
   determining the difference value according to the value range and a total number of candidate addresses in the m-th portion of candidate addresses.

7. The flash memory initialization method of claim 6, wherein the another different capacity size is a capacity size of a (m−1)-th portion of candidate addresses.

8. The flash memory initialization method of claim 7, wherein the consecutive storage addresses are separated by the capacity size of the m-th portion of candidate addresses and the capacity size of the (m−1)-th portion of candidate addresses.

9. The flash memory initialization method of claim 7, wherein the capacity size of the m-th portion of candidate addresses indicates $CAP_m$ gigabytes, and the capacity size of the (m−1)-th portion of candidate addresses $CAP_{m-1}$; the value range is from $CAP_{m-1} \times 8^{10}$ to $CAP_m \times 8^{10}$; the difference value is equal to $$\frac{CAP_m \times 8^{10} - CAP_{m-1} \times 8^{10}}{\frac{N}{M}};$$

and, the multiple address values of the m-th portion of candidate addresses comprise $(CAP_{m-1} \times 8^{10} + i_m)$, $$\frac{CAP_m \times 8^{10}}{\frac{N}{M}} + (CAP_{m-1} \times 8^{10} + i_m),$$

$$\frac{CAP_m \times 8^{10}}{\frac{N}{M}} \times 2 + (CAP_{m-1} \times 8^{10} + i_m)$$

$$\frac{CAP_m \times 8^{10}}{\frac{N}{M}} \times 3 + (CAP_{m-1} \times 8^{10} + i_m),$$

and $$\frac{CAP_m \times 8^{10}}{\frac{N}{M}} \times \left(\frac{N}{M} - 1\right) + (CAP_{m-1} \times 8^{10} + i_m)$$

wherein $i_m$ is an offset integer which may range from zero to $$\left(\frac{CAP_m \times 8^{10} - CAP_{m-1} \times 8^{10}}{\frac{N}{M}} - 1\right).$$

10. The flash memory initialization method of claim 1, wherein a number of a first portion of candidate addresses is different from a number of a second portion of candidate addresses.

11. A flash memory controller for controlling a flash memory device, comprising:
- a read-only memory (ROM), for recording a specific program code;
- a processing circuit, coupled to the ROM, for reading the specific program code when the controller is powered, and for executing the specific program code to:
  - determining an acceptable maximum number N of candidate addresses each being formed by a combination of a row address and a column address wherein N is an integer;
  - determining a number M of different capacity sizes which can be supported by the flash memory device wherein M is an integer smaller than N;
  - classifying the candidate addresses into M portions respectively corresponding to the different capacity sizes to determine a number of candidate addresses in each of the M portions;
  - for an m-th portion of candidate addresses wherein m ranges from one to M:
    - determining a difference value between two address values of any two adjacent addresses among the m-th portion of candidate addresses;
    - determining multiple address values of the m-th portion of candidate addresses according to the difference value between the two address values of the any two adjacent addresses; and
    - determining actual addresses of the m-th portion of candidate addresses according to the multiple address values of the m-th portion of candidate addresses; and
  - writing boot up information from the flash memory initialization device into the flash memory device by controlling the flash memory controller to write the boot up information into at least one storage location corresponding to at least one of the m-th portion of candidate addresses in the flash memory device according to the actual addresses of the m-th portion of candidate addresses.

12. The flash memory controller of claim 11, wherein $N = M \times 2^A$, A is an integer.

13. The flash memory controller of claim 12, wherein the number of candidate addresses in each of the M portions is equal to N/M.

14. The flash memory controller of claim 11, wherein the step of determining the difference value between the two address values of the any two adjacent addresses among the m-th portion of candidate addresses comprises:
- determining a value range of addresses covered by a capacity size corresponding to the m-th portion of candidate addresses; and
- determining the difference value according to the value range and a total number of candidate addresses in the m-th portion of candidate addresses.

15. The flash memory controller of claim 14, wherein the capacity size indicates $CAP_m$ gigabytes; the value range is from zero to $CAP_m \times 8^{10}$; the difference value is equal to $$\frac{CAP_m \times 8^{10}}{\frac{N}{M}};$$

and, the multiple address values of the m-th portion of candidate addresses comprise $i_m$, $$\frac{CAP_m \times 8^{10}}{\frac{N}{M}} + i_m,$$

$$\frac{CAP_m \times 8^{10}}{\frac{N}{M}} \times 2 + i_m,$$

$$\frac{CAP_m \times 8^{10}}{\frac{N}{M}} \times 3 + i_m,$$

and $$\frac{CAP_m \times 8^{10}}{\frac{N}{M}} \times \left(\frac{N}{M} - 1\right) + i_m$$

wherein $i_m$ is an offset integer which may range from zero to $$\left(\frac{CAP_m \times 8^{10}}{\frac{N}{M}} - 1\right).$$

16. The flash memory controller of claim 11, wherein the step of determining the difference value between the two address values of the any two adjacent addresses among the m-th portion of candidate addresses comprises:
- determining a value range of consecutive storage addresses defined by a capacity size of the m-th portion of candidate addresses and another different capacity size; and
- determining the difference value according to the value range and a total number of candidate addresses in the m-th portion of candidate addresses.

17. The flash memory controller of claim 16, wherein the another different capacity size is a capacity size of a (m−1)-th portion of candidate addresses.

18. The flash memory controller of claim 17, wherein the consecutive storage addresses are separated by the capacity size of the m-th portion of candidate addresses and the capacity size of the (m−1)-th portion of candidate addresses.

19. The flash memory controller of claim 18, wherein the capacity size of the m-th portion of candidate addresses indicates $CAP_m$ gigabytes, and the capacity size of the (m−1)-th portion of candidate addresses $CAP_{m-1}$; the value range is from $CAP_{m-1} \times 8^{10}$ to $CAP_m \times 8^{10}$; the difference value is equal to $$\frac{CAP_m \times 8^{10} - CAP_{m-1} \times 8^{10}}{\frac{N}{M}};$$

and, the multiple address values of the m-th portion of candidate addresses comprise $(CAP_{m-1} \times 8^{10} + i_m)$, $$\frac{CAP_m \times 8^{10}}{\frac{N}{M}} + (CAP_{m-1} \times 8^{10} + i_m),$$

$$\frac{CAP_m \times 8^{10}}{\frac{N}{M}} \times 2 + (CAP_{m-1} \times 8^{10} + i_m),$$

$$\frac{CAP_m \times 8^{10}}{\frac{N}{M}} \times 3 + (CAP_{m-1} \times 8^{10} + i_m),$$

and $$\frac{CAP_m \times 8^{10}}{\frac{N}{M}} \times \left(\frac{N}{M} - 1\right) + (CAP_{m-1} \times 8^{10} + i_m)$$

wherein $i_m$ is an offset integer which may range from zero to $$\left(\frac{CAP_m \times 8^{10} - CAP_{m-1} \times 8^{10}}{\frac{N}{M}} - 1\right).$$

20. The flash memory controller of claim 11, wherein a number of a first portion of candidate addresses is different from a number of a second portion of candidate addresses.

* * * * *